United States Patent
Whitacre (10) Patent No.: US 9,356,276 B2
(45) Date of Patent: May 31, 2016

(54) PROFILE RESPONSIVE ELECTRODE ENSEMBLE

(75) Inventor: Jay Whitacre, Pittsburgh, PA (US)

(73) Assignee: AQUION ENERGY INC., Pittsburgh, PA (US)

(*) Notice: Subject to any disclaimer, the term of this patent is extended or adjusted under 35 U.S.C. 154(b) by 1077 days.

(21) Appl. No.: 13/408,685

(22) Filed: Feb. 29, 2012

(65) Prior Publication Data

US 2013/0057220 A1    Mar. 7, 2013

Related U.S. Application Data

(60) Provisional application No. 61/447,833, filed on Mar. 1, 2011.

(51) Int. Cl.
| | |
|---|---|
| *H02J 7/00* | (2006.01) |
| *H01M 2/20* | (2006.01) |
| *H01M 4/50* | (2010.01) |
| *H01M 10/04* | (2006.01) |
| *H01M 10/05* | (2010.01) |

(52) U.S. Cl.
CPC ......... *H01M 2/20* (2013.01); *H01M 4/50* (2013.01); *H01M 10/04* (2013.01); *H01M 10/05* (2013.01); *Y10T 29/49108* (2015.01)

(58) Field of Classification Search
CPC ..... Y02E 60/12; H02J 7/0003; H01M 2/0245
USPC ............... 320/106, 128, 134, 136; 429/7, 156
See application file for complete search history.

(56) References Cited

U.S. PATENT DOCUMENTS

| | | | |
|---|---|---|---|
| 3,871,924 A | 3/1975 | DeMattie et al. | |
| 4,100,332 A | 7/1978 | Carr | |
| 4,246,253 A | 1/1981 | Hunter | |
| 5,316,877 A | 5/1994 | Thackeray et al. | |
| 5,318,142 A | 6/1994 | Bates et al. | |
| 5,476,734 A | 12/1995 | Pulley et al. | |
| 5,525,442 A | 6/1996 | Shuster | |
| 5,558,961 A | 9/1996 | Doeff et al. | |
| 5,614,331 A * | 3/1997 | Takeuchi et al. ................. | 429/9 |
| 5,639,577 A | 6/1997 | Takeuchi et al. | |
| 5,958,624 A | 9/1999 | Frech et al. | |
| 5,963,417 A | 10/1999 | Anderson et al. | |

(Continued)

FOREIGN PATENT DOCUMENTS

| | | |
|---|---|---|
| CN | 101154745 A | 4/2008 |
| JP | 2000-331682 A | 11/2000 |

(Continued)

OTHER PUBLICATIONS

International Search Report & Written Opinion issued in PCT Application No. PCT/US2012/027098, mailed on Nov. 30, 2012.
Pesaran, Ahmad et al., "Ultracapacitors and Batteries in Hybrid Vehicles", In: the Advanced Capacitors conference, Aug. 31, 2005.
Mikkelsen, Karl Ba., "Design and Evaluation of Hybrid Energy Storage Systems for Electric Powertrains", KA master thesis of the University of Waterloo, Sep. 30, 2010.
Akimoto et al., "Synthesis and Electrochemical Properties of $Li_{0.44}MnO_2$ as a Novel 4 V Cathode Material," Electrochemical and Solid-State Letters, 2005, 8(10):A554-A557.
Alcantara et al., "Carbon Microspheres Obtained from Resorcinol-Formaldehyde as High-Capacity Electrodes for Sodium-Ion Batteries," Electrochemical and Solid-State Letters, 2005, 8(4):A222-A225.

(Continued)

*Primary Examiner* — Edward Tso
*Assistant Examiner* — Aaron Piggush
(74) *Attorney, Agent, or Firm* — The Marbury Law Group PLLC (57) ABSTRACT

An electrochemical energy storage system including at least a first type of electrochemical cell and a second type of electrochemical cell. The first type of electrochemical cell and the second type of electrochemical cell have different geometries. Also methods of making and using the electrochemical energy storage system.

15 Claims, 2 Drawing Sheets

(56) References Cited

U.S. PATENT DOCUMENTS

| | | | |
|---|---|---|---|
| 6,017,654 | A | 1/2000 | Kumta et al. |
| 6,040,089 | A | 3/2000 | Manev et al. |
| 6,159,637 | A | 12/2000 | Shizuka et al. |
| 6,165,638 | A | 12/2000 | Spillman et al. |
| 6,248,477 | B1 | 6/2001 | Howard, Jr. et al. |
| 6,267,943 | B1 | 7/2001 | Manev et al. |
| 6,322,744 | B1 | 11/2001 | Kelley et al. |
| 6,325,988 | B1 | 12/2001 | Inoue et al. |
| 6,383,683 | B1 | 5/2002 | Nagayama et al. |
| 6,413,673 | B1 | 7/2002 | Kasai et al. |
| 6,423,294 | B2 | 7/2002 | Manev et al. |
| 6,465,129 | B1 | 10/2002 | Xu et al. |
| 6,465,130 | B1 | 10/2002 | Numata et al. |
| 6,531,220 | B1 | 3/2003 | Kweon et al. |
| 6,599,662 | B1 | 7/2003 | Chiang et al. |
| 6,623,884 | B1 | 9/2003 | Spillman et al. |
| 6,670,076 | B1 | 12/2003 | Iwata et al. |
| 6,673,491 | B2 | 1/2004 | Shirakawa et al. |
| 6,692,665 | B2 | 2/2004 | Shima et al. |
| 6,787,232 | B1 | 9/2004 | Chiang et al. |
| 6,814,894 | B2 | 11/2004 | Shoji et al. |
| 6,869,547 | B2 | 3/2005 | Barker et al. |
| 6,872,492 | B2 | 3/2005 | Barker et al. |
| 6,926,991 | B2 | 8/2005 | Gan et al. |
| 7,008,726 | B2 | 3/2006 | Adamson et al. |
| 7,041,239 | B2 | 5/2006 | Barker et al. |
| 7,056,486 | B2 | 6/2006 | Park et al. |
| 7,087,346 | B2 | 8/2006 | Barker et al. |
| 7,199,997 | B1 | 4/2007 | Lipka et al. |
| 7,214,448 | B2 | 5/2007 | Barker et al. |
| 7,335,444 | B2 | 2/2008 | Numata et al. |
| 8,137,830 | B2 | 3/2012 | Whitacre |
| 2002/0009645 | A1 | 1/2002 | Shima et al. |
| 2002/0048706 | A1 | 4/2002 | Mayes et al. |
| 2002/0062138 | A1 | 5/2002 | Gan et al. |
| 2002/0182502 | A1 | 12/2002 | Park et al. |
| 2003/0035999 | A1 | 2/2003 | Gao et al. |
| 2003/0186128 | A1 | 10/2003 | Singh et al. |
| 2003/0190528 | A1 | 10/2003 | Saidi et al. |
| 2004/0185339 | A1 | 9/2004 | Jones |
| 2004/0191627 | A1 | 9/2004 | Takahashi et al. |
| 2004/0262571 | A1 | 12/2004 | Barker et al. |
| 2005/0181280 | A1 | 8/2005 | Ceder et al. |
| 2005/0181283 | A1 | 8/2005 | Pugh et al. |
| 2005/0238961 | A1 | 10/2005 | Barker et al. |
| 2006/0019166 | A1 | 1/2006 | Numata et al. |
| 2006/0035151 | A1 | 2/2006 | Kumeuchi et al. |
| 2006/0154071 | A1 | 7/2006 | Homma et al. |
| 2006/0263688 | A1 | 11/2006 | Guyomard et al. |
| 2007/0072034 | A1 | 3/2007 | Barker et al. |
| 2007/0090808 | A1 | 4/2007 | McCabe et al. |
| 2008/0008937 | A1 | 1/2008 | Eylem et al. |
| 2008/0158778 | A1 | 7/2008 | Lipka et al. |
| 2008/0199737 | A1 | 8/2008 | Kazaryan et al. |
| 2009/0033274 | A1 | 2/2009 | Perisic et al. |
| 2009/0033286 | A1 | 2/2009 | Rosa et al. |
| 2009/0053613 | A1 | 2/2009 | Inoue et al. |
| 2009/0253025 | A1 | 10/2009 | Whitacre |
| 2010/0239913 | A1 | 9/2010 | Kelley et al. |
| 2011/0052945 | A1 | 3/2011 | Whitacre |
| 2011/0311854 | A1 | 12/2011 | Takeuchi et al. |
| 2012/0064388 | A1 | 3/2012 | Whitacre |

FOREIGN PATENT DOCUMENTS

| | | |
|---|---|---|
| JP | 2003-086179 A | 3/2003 |
| KR | 10-2001-0024357 A | 3/2001 |
| KR | 10-2007-0100918 A | 10/2007 |
| WO | WO02/052067 A1 | 7/2002 |
| WO | WO2006/111079 A1 | 10/2006 |
| WO | WO2008/051885 A1 | 5/2008 |
| WO | WO2009/126525 A2 | 10/2009 |

OTHER PUBLICATIONS

Alcantara et al., "NiCo$_2$O$_4$ Spinel: First Report on a Transition Metal Oxide for the Negative Electrode of Sodium-Ion Batteries," Chem. Mater., 2002, 14:2847-2848.

Athouel et al., "Birnessite as Possible Candidate for Hybrid Carbon/MnO$_2$ Electrochemical Capacitor," Abstract from 214th ECS Meeting, Honolulu, HI, Oct. 12-17, 2008.

Bordet-Le Geunne et al., "Structural study of two layered phases in the Na$_x$Mn$_y$O$_2$ system. Electrochemical behavior of their lithium substituted derivatives," J. Mater. Chem., 2000, 10:2201-2206.

Brousse et al., "A Hybrid Activated Carbon-Manganese Dioxide Capacitor using a Mild Aqueous Electrolyte," Journal of the Electrochemical Society, 2004, 151(4):A614-A622.

Brousse et al., "Crystalline MnO$_2$ as Possible Alternatives to Amorphous Compounds in Electrochemical Supercapacitors," Journal of Electrochemical Society, 2006: 153, A2171-A2080.

Cvjeticanin et al., "Cyclic voltammetry of LiCr$_{0.15}$Mn$_{1.85}$O$_4$ in an aqueous LiNO$_3$ solution," Journal of Power Sources, 2007, 174:1117-1120.

Doeff et al., "A High-Rate Manganese Oxide for Rechargeable Lithium Battery Applications," Journal of the Electrochemical Society, 2001, 148(3):A230-A236.

Doeff et al., "Electrochemical and structural characterization of titanium-substituted manganese oxides based on Na$_{0.44}$MnO$_2$," Journal of Power Sources, 2004, 125:240-248.

Doeff et al., "Lithium Insertion Processes of Orthorhombic Na$_x$MnO$_2$-Based Electrode Materials," J. Electrochem. Soc., Aug. 1996, 143(8):2507-2516.

Doeff et al., "Synthesis and characterization of a copper-substituted manganese oxide with the Na$_{0.44}$MnO$_2$ structure," Journal of Power Sources, 2002, 112:294-297.

Doeff et al., "Orthorhomic Na$_x$MnO$_2$ as a Cathode Material for Secondary Sodium and Lithium Polymer Batteries," J. Electrochem Soc. vol. 141, No. 11, Nov. 1994.

Eftekhari et al., "Effect of Na diffusion on the formation of fibrous microcrystals of manganese oxide," Materials Research Bulletin, 2005, 40:2205-2211.

Feng et al., "Hydrothermal Soft Chemical Synthesis of Tunnel Manganese Oxides with Na$^+$ as Template," Chemistry Letters, 2000:284-285.

Huang et al., "Kinetics of Electrode Processes of LiFePO$_4$ in Saturated Lithium Nitrate Solution," Acta Phys.-Chim. Sin., 2007, 23(1):129-133.

Imanishi et al., "Study of Electrochemical Sodium Deintercalation of a Na$_x$FeO$_2$," Denki Kagaku, 1993, 61 (12): 1451-1452.

PCT/US2009/039436, International Search Report & Written Opinion, Nov. 13, 2009, 8pgs; & International Preliminary Report on Patentability, Oct. 21, 2010, 5pgs.

Jin et al., "Hybrid supercapacitor based on MnO2 and columned FeOOH using Li$_2$SO$_4$ electrolyte solution," Journal of Power Sources, 2008, 175:686-691.

Kanoh et al., "Electrochemical Intercalation of Alkali-Metal Ions into Birnessite-Type Manganese Oxide in Aqueous Solution," Langmuir, 1997, 13:6845-6849.

Kanoh et al., "Equilibrium Potentials of Spinel-Type Manganese Oxide in Aqueous Solutions," J. Electrochem. Soc., Nov. 1993, 140(11):3162-3166.

Kim et al., "Electrochemical properties of sodium/pyrite battery at room temperature," Journal of Power Sources, 2007, 174:1275-1278.

Kim et al., "Ionic conductivity of sodium ion with NaCF$_3$SO$_3$ salts in electrolyte for sodium batteries," Materials Science Forum, 2005, 486-487:638-641.

Komaba et al., "Enhanced Supercapacitive Behaviors of Birnessite Type Manganese Dioxide," Abstract from 214th ECS Meeting, Honolulu, HI, Oct. 12-17, 2008.

Li et al., "A study of nitroxide polyradical/activated carbon composite as the positive electrode material for electrochemical hybrid capacitor," Electrochimica Acta, 2007, 52:2153-2157.

Li et al., "Rechargeable Lithium Batteries with Aqueous Electrolytes," Science, May 20, 1994, 264:1115-1118.

(56) References Cited

OTHER PUBLICATIONS

Ma et al., "A novel concept of hybrid capacitor based on manganese oxide materials," Electrochemistry Communications, 2007, 9:2807-2811.

Mi et al., "Electrochemical behaviors of solid $LiFePO_4$ and $Li_{0.99}Nb_{0.01}FePO_4$ in $Li_2SO_4$ aqueous electrolyte," Journal of Electroanalytical Chemistry, 2007, 602:245-254.

Park et al., "A Study of Copper as a Cathode Material for an Ambient Temperature Sodium Ion Batter," Journal of the Electrochemical Society, 2001, 148(12):A1346-A1351.

Park et al., "Room-Temperature Solid-State Sodium/Sulfur Battery," Electrochemical and Solid-Satte Letters, 2006, 9(3):A123-A125.

Pitcher, Graham, "If the cap fits . . . How supercapacitors can help to solve power problems in portable products," New Electronics, Portable Products Special Report, www.neon.co.uk, Mar. 28, 2006, 25-26.

Renuka, "An Investigation on Layered Birnessite Type Manganese Oxides for Battery Applications," Journal of Power Sources, 2000, 78: 144-152.

Rydh et al., "Energy analysis of batteries in photovoltaic systems. Part I: Performance and energy requirements," Energy Conversion and Management, 2005, 46:1957-1979.

Rydh et al., "Energy analysis of batteries in photovoltaic systems. Part II: Performance and energy requirements," Energy Conversion and Management, 2005, 46:1980-2000.

Sauvage et al., "Study of the Insertion/Deinsertion Mechanism of Sodium into $Na_{0.44}MnO_2$," Inorganic Chemistry, 2007, 46:3289-3294.

Sauvage et al., "Study of the potentiometric response towards sodium ions of $Na_{0.44-x}MnO_2$ for the development of selective sodium ion sensors," Sensors and Actuators B, 2007, 120:638-644.

Spahr et al., "Electrochemical insertion of lithium, sodium, and magnesium in molybdenum(VI) oxide," Journal of Power Sources, 1995, 54:346-351.

Su et al., "Symmetric Self-Hybrid Supercapacitor Consisting of Multiwall Carbon Nanotubes and Co—Al Layered Double Hydroxides," Journal of the Electrochemical Society, 2008, 155(2):A110-A114.

Tani et al,. "Alkali Metal Ion-Selective Electrodes Based on Relevant Alkali Metal Ion Doped Manganese Oxides," Mikrochim. Acta 1998, 129:81-90.

Tevar et al., Cycling-Induced Crystallographic & Morphological Changes in Na4Mn9O18. 214th ECS Meeting, Abstract #642, The Electrochemical Society, Oct. 2008.

Toupin et al., "Charge Storage Mechanism of $MnO_2$ Electrode Used in Aqueous Electrochemical Capacitor," Chemistry of Materials, 2004, 16: 3184-3190.

Wang et al., "Improvement of cycle performance of lithium ion cell $LiMn_2O_4/Li_xV_2O_5$ with aqueous solution electrolyte by polypyrrole coating an anode," Electrochimica Acta, 2007, 52:5102-5107.

Wang et al., "A New Concept Hybrid Electrochemical Supercapacitor: Carbon/$LiMn_2O_4$ Aqueous System," Electrochemistry Communications, 2005, 7:1138-1142.

Whitacre et al., "Na4Mn9O18 as a Positive Electrode Material for an Aqueous Electrolyte Sodium-Ion Energy Storage Device," Electrochemistry Communications, 2010, 12:463-466.

Yang et al., "Interfacial synthesis of porous $MnO_2$ and its application in electrochemical capacitor," Electrochimica Acta, 2007, 53:752-757.

Zhuo et al., "The preparation of $NaV_{1-x}Cr_xPO_4F$ cathode materials or sodium-ion battery," Journal of Power Sources, 2006, 160:698-703.

Bursell et al., "Ultra Thin Nickel Electrodes for Hybrid Supercapacitors," Proc. Electrochem. Soc. 2002.

Styler et al., "Active Management of a Heterogeneous Energy Store for Electric Vehicles," 2011 IEEE Forum on Integrated & Sustainable Transportation System (FISTS), Jun. 29-Jul. 1, 2011, Vienna, Austria.

\* cited by examiner

PROFILE RESPONSIVE ELECTRODE ENSEMBLE

The present application claims benefit of priority of U.S. Provisional Application Ser. No. 61/447,833 filed on Mar. 1, 2011 and incorporated herein by reference in its entirety.

FIELD

The present invention is directed to electrochemical energy storage systems and in particular to hybrid electrochemical energy storage systems.

BACKGROUND

Small renewable energy harvesting and power generation technologies (such as solar arrays, wind turbines, micro sterling engines, and solid oxide fuel cells) are proliferating, and there is a commensurate strong need for intermediate size secondary (rechargeable) energy storage capability. Batteries for these stationary applications typically store between 1 and 50 kWh of energy (depending on the application) and have historically been based on the lead-acid (Pb acid) chemistry. Banks of deep-cycle lead-acid cells are assembled at points of distributed power generation and are known to last 1 to 10 years depending on the typical duty cycle. While these cells function well enough to support this application, there are a number of problems associated with their use, including: heavy use of environmentally unclean lead and acids (it is estimated that the Pb-acid technology is responsible for the release of over 100,000 tons of Pb into the environment each year in the US alone), significant degradation of performance if held at intermediate state of charge or routinely cycled to deep levels of discharge, a need for routine servicing to maintain performance, and the implementation of a requisite recycling program. There is a strong desire to replace the Pb-acid chemistry as used by the automotive industry. Unfortunately the economics of alternative battery chemistries has made this a very unappealing option to date.

Despite all of the recent advances in battery technologies, there are still no low-cost, clean alternates to the Pb-acid chemistry. This is due in large part to the fact that Pb-acid batteries are remarkably inexpensive compared to other chemistries ($200/kWh), and there is currently a focus on developing higher-energy systems for transportation applications (which are inherently significantly more expensive than Pb-acid batteries).

SUMMARY

An embodiment relates to an electrochemical energy storage system including at least a first type of electrochemical cell and a second type of electrochemical cell. The first type of electrochemical cell and the second type of electrochemical cell have different geometries.

Another embodiment relates to a method of making an electrochemical energy storage system. The method includes the step of operatively connecting at least a first type of electrochemical cell and a second type of electrochemical cell. The first type of electrochemical cell and the second type of electrochemical cell have different geometries.

Another embodiment, relates to a method of using an electrochemical energy storage system. The method includes the step of drawing electricity from the electrochemical energy storage system. The electrochemical energy storage system includes at least a first type of electrochemical cell and a second type of electrochemical cell. The first type of electrochemical cell and the second type of electrochemical cell have different geometries.

DETAILED DESCRIPTION

Embodiments of the invention are drawn to electrochemical energy storage systems, such as primary and secondary batteries and hybrid energy storage systems described below. While secondary hybrid aqueous energy storage systems described below are preferred embodiments of the invention, the invention is also applicable to any suitable electrochemical energy storage systems, such as aqueous and non-aqueous electrolyte containing batteries (e.g., having anodes and cathodes which intercalate ions from the electrolyte, including Li-ion batteries, etc.) and non-aqueous electrolyte containing hybrid storage systems having different cells with different electrode geometries.

Electrochemical energy storage systems, such as secondary hybrid aqueous energy storage cells with thinner electrodes can be charged and discharged at higher currents over a shorter period of time relative to cells with thicker electrodes. Thinner electrode cells can also be charged and discharged at higher energy and power densities and/or higher specific power values than thicker electrode cells. Cells with thinner electrodes, however, cost more per unit energy to manufacture than cells with thicker electrodes. Cells with thicker electrodes are cheaper to manufacture. However, they require longer times to extract their total energy content. As used herein, a cell with thinner electrodes has anode and cathode electrodes which are at least 25% thinner, such as at least 50% thinner, such as at least 100% thinner, for example 25-500% thinner than a cell with thicker respective anode and cathode electrodes.

Embodiments of the invention are drawn to energy storage systems which include a plurality of stacks of electrochemical storage cells in which all of the individual cells in a given stack are made of the same materials and have the same chemistries but have different electrode geometries from cells in one or more other stacks in the system. In other words, preferably, the anode, cathode, electrolyte and separator of a first type of electrochemical cell in a first stack comprise same materials as the respective anode, cathode, electrolyte and separator of the second type of electrochemical cell in second stack, while the first and the second types of cells have different geometries from each other.

In an embodiment, "different geometries" refers to cells having electrodes of different thickness. That is, the anodes and cathodes of one type of cell in one stack are thicker than the anodes and cathodes of a second type of cell in one or more other stacks. The energy storage systems of one embodiment may be considered a hybrid system, where thin electrode elements can be thought of as capacitors or supercapacitors, and thicker electrode elements can be thought of as batteries with lower rate capabilities. However, these systems preferably have the same class of cells in each stack.

For example, the first and the second types of cells may each be a battery cell having both the cathode and anode electrode which undergo reversible faradic reactions that intercalates and deintercalates the ions into and from each electrode. Alternatively, the first and the second types of cells may each be a hybrid cell in which a double-layer capacitor electrode is coupled with an active electrode. In these systems, the capacitor (e.g., anode) electrode stores charge through a reversible nonfaradiac reaction of alkali cations on the surface of the electrode (double-layer) and/or pseudocapacitance, while the active (e.g., cathode) electrode undergoes a reversible faradic reaction in the electrode material that intercalates and deintercalates the alkali cations similar to that of a battery. Thus, the first stack may include battery cells having one thickness anode and cathode electrodes while the second stack may include battery cells having a different thickness anode and cathode electrodes from the respective anode and cathode electrodes of the first stack. Alternatively, the first stack may include hybrid cells having one thickness anode and cathode electrodes while the second stack may include hybrid cells having a different thickness anode and cathode electrodes from the respective anode and cathode electrodes of the first stack. This is different from simply incorporating plural stacks each containing a different class of cells (e.g., a stack of battery cells and a stack of supercapacitor cells) into the same housing or device.

It should be noted that the cells do not have to be arranged in an exact stack configuration. Therefore, the cells with the same geometry electrodes which are electrically connected in series will be referred to as a module, which includes series connected cells arranged in stack or other geometrical configurations.

A system may include two or more modules. In systems with three or more modules, all of the modules may be of different type (e.g., each module having cells with different electrode geometry from cells of other modules) or some modules may be of the same type (e.g., two or more modules having cells with the same geometry). For example, if the system includes four modules the following combinations are possible: (1) all four could be of a different type, (3) three modules could be of the same type, the fourth being a different type and (3) two type modules could be one type and two modules of one or more different types. In other words, if the system has three modules, the electrodes of the cells of the first module may be thicker than those of the other two modules and the electrodes of the cells of the second module may be thicker than those of the third module.

Figure 1:
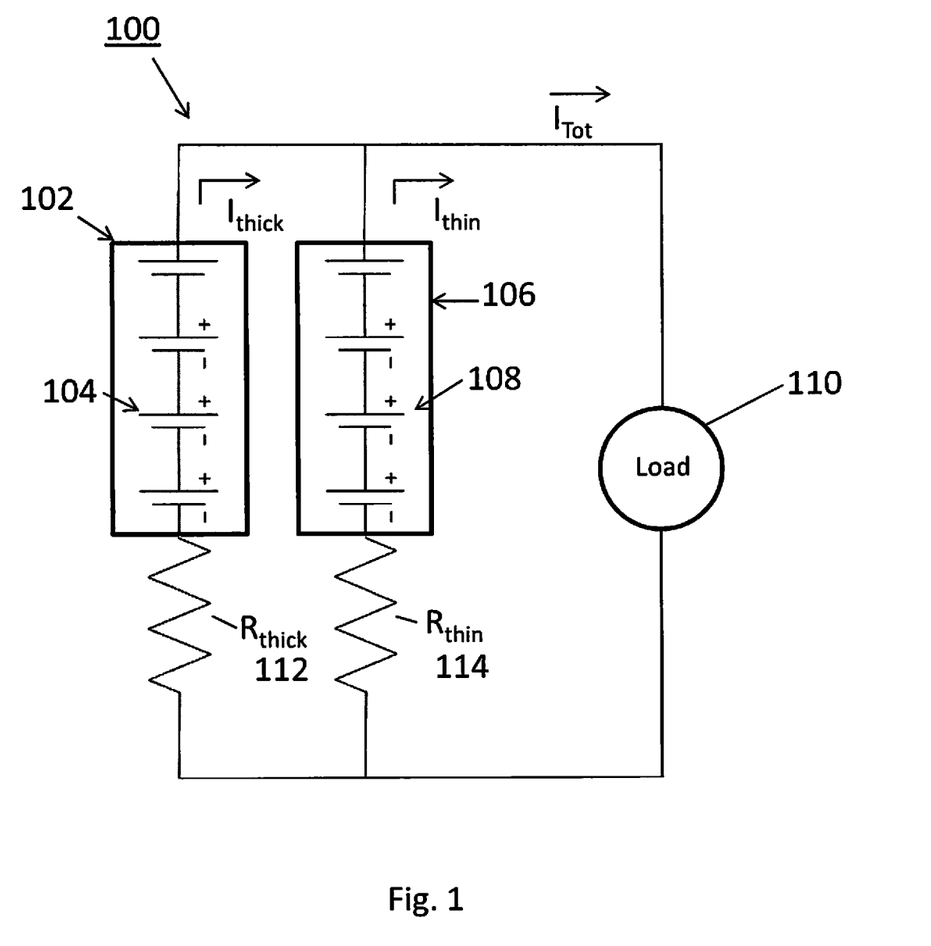
FIG. 1 illustrates an equivalent circuit of a secondary energy storage system according to an embodiment of the present invention.

FIG. 1 illustrates an equivalent circuit of an embodiment of an energy storage system 100 which includes a module 102 having multiple electrochemical cells 104 with thick electrodes and a module 106 which includes multiple electrochemical cells 108 with thin electrodes. A load 110 attached to the system 100 draws a total current $I_{Tot}$ which is the sum of the current $I_{thick}$ from the module 102 with thick electrodes and the current $I_{thin}$ from the module 106 with thin electrodes. The equivalent circuit also includes a resistor 112 representing the resistance of the "thick" module 102 and resistor 114 representing the resistance of the "thin" module 106. As can be seen from FIG. 1, the modules (e.g., stacks) 102, 106 are electrically connected in parallel and contain the same number of cells. Details of the preferred electrochemical cells 104, 108 are discussed in more detail below.

An embodiment of the method of making the system 100 includes performing an analysis of the energy storage duty profile for a desired application and then creating an energy storage system that economically addresses the storage needs by combining modules that contain cells with different thickness electrodes. In an aspect, a Fourier analysis is performed on a nominal duty profile. The Fourier analysis reveals the different time domains over which energy should be stored and discharged for each type of cell and module. The anode and cathode thicknesses in each type of cell may be selected based on the determination of the time domains.

In some cases, there are several very distinct time domain values where the optimal solution will not be a single electrode thickness, but rather a combination of thicknesses. By connecting different types of modules in parallel and though natural impedance matching, the hybrid energy storage systems are able to be responsive to the predetermined duty profile for which they were designed.

In an embodiment of the method of using the hybrid energy storage system, electricity is drawn from at least two types of electrochemical cells. That is, two cells having different anode and cathode geometries (e.g., electrode thicknesses). Preferably, the two types of electrochemical cells are impedance matched for a predetermined duty profile. In one aspect, the cell with the thicker electrodes operates as a battery and the cell with the thinner electrodes operates as a capacitor or supercapacitor, discharging at a higher current over shorter time periods than the electrochemical cell with the thicker electrodes. In an embodiment, current can be supplied to the electrochemical energy storage system to recharge the electrochemical cells (e.g., cells of a secondary system).

Secondary (rechargeable) energy storage cells of embodiments of the present invention comprise an anode (i.e., negative) electrode, an anode side current collector, a cathode (i.e., positive) electrode, a cathode side current collector, a separator, and an alkali or alkali earth ion (e.g., Na, Li, Mg, K and/or Ca) containing electrolyte, preferably an aqueous electrolyte. Any material capable of reversible intercalation/deintercalation of alkali or alkali earth metal cations, such as Li, Na, Mg, K and/or Ca) may be used as an active cathode material.

Figure 2:
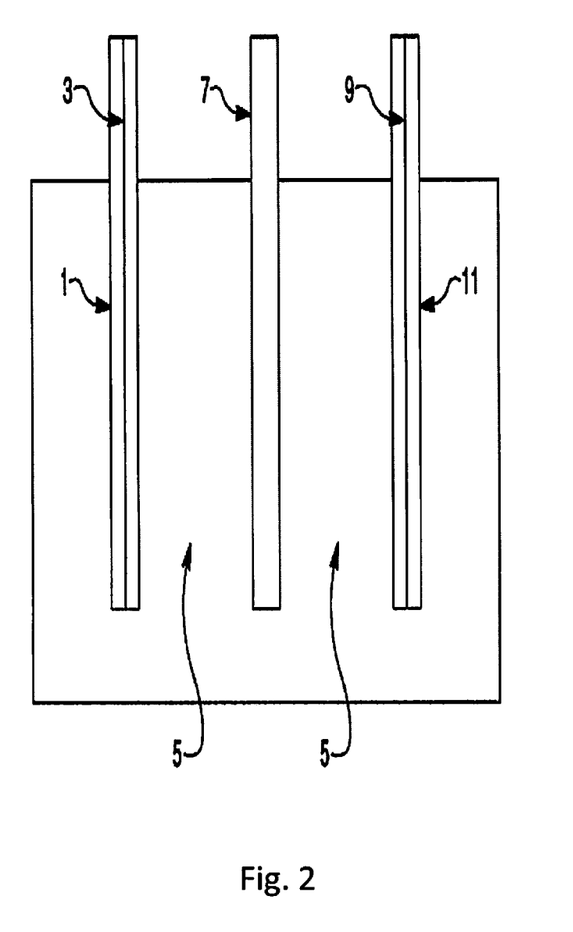
FIG. 2 is a schematic illustration of a secondary energy storage cell suitable for use in the system illustrate in FIG. 1.

As shown in the schematic of an exemplary device in FIG. 2, the cathode side current collector 1 is in contact with the cathode electrode 3. The cathode electrode 3 is in contact with the electrolyte solution 5, which is also in contact with the anode electrode 9. The separator 7 is located in the electrolyte solution 5 at a point between the cathode electrode 3 and the anode electrode 9. The anode electrode is also in contact with the anode side current collector 11. In FIG. 2, the components of the exemplary device are shown as not being in contact with each other. The device was illustrated this way to clearly indicate the presence of the electrolyte solution relative to both electrodes. However, in actual embodiments, the cathode electrode 3 is in contact with the separator 7, which is in contact with the anode electrode 9.

Hybrid electrochemical energy storage systems of embodiments of the present invention include a double-layer capacitor electrode coupled with an active electrode. In these systems, the capacitor (e.g., anode) electrode stores charge through a reversible nonfaradiac reaction of Na cations on the surface of the electrode (double-layer) and/or pseudocapacitance, while the active (e.g., cathode) electrode undergoes a reversible faradic reaction in a transition metal oxide that intercalates and deintercalates the cations similar to that of a battery.

An example of a Li-based system has been described by Wang, et al., which utilizes a spinel structure $LiMn_2O_4$ battery electrode, an activated carbon capacitor electrode, and an aqueous $Li_2SO_4$ electrolyte. Wang, et al., *Electrochemistry Communications*, 7:1138-42 (2005), incorporated herein by reference in its entirety. In this system, the negative anode electrode stores charge through a reversible nonfaradiac reaction of Li-ion on the surface of an activated carbon electrode.

The positive cathode electrode utilizes a reversible faradiac reaction of Li-ion intercalation/deintercalation in spinel $LiMn_2O_4$.

An example of a Na-based system which may be used as the cells in the modules described above is described in U.S. patent application Ser. No. 12/385,277 filed on Apr. 3, 2009 (naming Jay Whitacre as an inventor), and incorporated herein by reference in its entirety. Individual device components may be made of a variety of materials as follows.

Anode

Although the anode may, in general, comprise any material capable of reversibly storing Na-ions (and/or other alkali or alkali earth ions) through surface adsorption/desorption (via an electrochemical double layer reaction and/or a pseudocapacitive reaction (i.e. partial charge transfer surface interaction)) and have sufficient capacity in the desired voltage range. Exemplary materials meeting these requirements include porous activated carbon, graphite, mesoporous carbon, carbon nanotubes, disordered carbon, Ti-oxide (such as titania) materials, V-oxide materials, phospho-olivine materials, other suitable mesoporous ceramicmaterials, and a combinations thereof. In preferred embodiments, activated carbon is used as the anode material.

Optionally, the anode electrode may be in the form of a composite anode comprising one or more anode materials, a high surface area conductive diluent (such as conducting grade graphite, carbon blacks, such as acetylene black, non-reactive metals, and/or conductive polymers), a binder, such as PTFE, a PVC-based composite (including a $PVC-SiO_2$ composite), cellulose-based materials, PVDF, other non-reactive non-corroding polymer materials, or a combination thereof, plasticizer, and/or a filler. A composite anode may be formed my mixing a portion of one or more anode materials with a conductive diluent, and/or a polymeric binder, and pressing the mixture into a pellet. In some embodiments, a composite anode electrode may be formed from a mixture from about 50 to 90 wt % anode material, with the remainder of the mixture comprising a combination of one or more of diluent, binder, plasticizer, and/or filler. For example, in some embodiments, a composite anode electrode may be formed from about 80 wt % activated carbon, about 10 to wt % diluent, such as carbon black, and about 5 to 10 wt % binder, such as PTFE.

One or more additional functional materials may optionally be added to a composite anode to increase capacity and replace the polymeric binder. These optional materials include but are not limited to Zn, Pb, hydrated $NaMnO_2$ (birnassite), and hydrated $Na_{0.44}MnO_2$ (e.g., $NaMn_9O_{18}$ orthorhombic tunnel structure).

An anode electrode will generally have a thickness in the range of about 80 to 1600 μm. Generally, the anode will have a specific capacitance equal to or greater than 110 F/g, e.g. 110-150 F/g, and a specific area equal to or less than 1000 $m^2$/g, e.g. 600-800 $m^2$/g determined by BET method.

Cathode

Any suitable material comprising a transition metal oxide, sulfide, phosphate, or fluoride can be used as active cathode materials capable of reversible alkali and/or alkali earth ion, such as Na-ion intercalation/deintercalation. Materials suitable for use as active cathode materials in embodiments of the present invention preferably contain alkali atoms, such as sodium, lithium, or both, prior to use as active cathode materials. It is not necessary for an active cathode material to contain Na and/or Li in the as-formed state (that is, prior to use in an energy storage device). However, for devices which use a Na-based electrolyte, Na cations from the electrolyte should be able to incorporate into the active cathode material by intercalation during operation of the energy storage device. Thus, materials that may be used as cathodes in embodiments of the present invention comprise materials that do not necessarily contain Na in an as-formed state, but are capable of reversible intercalation/deintercalation of Na-ions during discharging/charging cycles of the energy storage device without a large overpotential loss.

In embodiments where the active cathode material contains alkali-atoms (preferably Na or Li) prior to use, some or all of these atoms are deintercalated during the first cell charging cycle. Alkali cations from a sodium based electrolyte (overwhelmingly Na cations) are re-intercalated during cell discharge. This is different than nearly all of the hybrid capacitor systems that call out an intercalation electrode opposite activated carbon. In most systems, cations from the electrolyte are adsorbed on the anode during a charging cycle. At the same time, the counter-anions, such as hydrogen ions, in the electrolyte intercalate into the active cathode material, thus preserving charge balance, but depleting ionic concentration, in the electrolyte solution. During discharge, cations are released from the anode and anions are released from the cathode, thus preserving charge balance, but increasing ionic concentration, in the electrolyte solution. This is a different operational mode from devices in embodiments of the present invention, where hydrogen ions or other anions are preferably not intercalated into the cathode active material and/or are not present in the device. The examples below illustrate cathode compositions suitable for Na intercalation. However, cathodes suitable for Li, K or alkali earth intercalation may also be used.

Suitable active cathode materials may have the following general formula during use: $A_xM_yO_z$, where A is Na or a mixture of Na and one or more of Li, K, Be, Mg, and Ca, where x is within the range of 0 to 1, inclusive, before use and within the range of 0 to 10, inclusive, during use; M comprises any one or more transition metal, where y is within the range of 1 to 3, inclusive; preferably within the range of 1.5 and 2.5, inclusive; and O is oxygen, where z is within the range of 2 to 7, inclusive; preferably within the range of 3.5 to 4.5, inclusive.

In some active cathode materials with the general formula $A_xM_yO_z$, Na-ions reversibly intercalate/deintercalate during the discharge/charge cycle of the energy storage device. Thus, the quantity x in the active cathode material formula changes while the device is in use.

In some active cathode materials with the general formula $A_xM_yO_z$, A comprises at least 50 at % of at least one or more of Na, K, Be, Mg, or Ca, optionally in combination with Li; M comprises any one or more transition metal; O is oxygen; x ranges from 3.5 to 4.5 before use and from 1 to 10 during use; y ranges from 8.5 to 9.5 and z ranges from 17.5 to 18.5. In these embodiments, A preferably comprises at least 51 at % Na, such as at least 75 at % Na, and 0 to 49 at %, such as 0 to 25 at %, Li, K, Be, Mg, or Ca; M comprises one or more of Mn, Ti, Fe, Co, Ni, Cu, V, or Sc; x is about 4 before use and ranges from 0 to 10 during use; y is about 9; and z is about 18.

In some active cathode materials with the general formula $A_xM_yO_z$, A comprises Na or a mix of at least 80 atomic percent Na and one or more of Li, K, Be, Mg, and Ca. In these embodiments, x is preferably about 1 before use and ranges from 0 to about 1.5 during use. In some preferred active cathode materials, M comprises one or more of Mn, Ti, Fe, Co, Ni, Cu, and V, and may be doped (less than 20 at %, such as 0.1 to 10 at %; for example, 3 to 6 at %) with one or more of Al, Mg, Ga, In, Cu, Zn, and Ni.

General classes of suitable active cathode materials include (but are not limited to) the layered/orthorhombic $NaMO_2$ (birnessite), the cubic spinel based manganate (e.g., $MO_2$, such as $\lambda$-$MnO_2$ based material where M is Mn, e.g., $Li_xM_2O_4$ (where $1 \leq x < 1.1$) before use and $Na_2Mn_2O_4$ in use), the $Na_2M_3O_7$ system, the $NaMPO_4$ system, the $NaM_2(PO_4)_3$ system, the $Na_2MPO_4F$ system, and the tunnel-structured $Na_{0.44}MO_2$, where M in all formulas comprises at least one transition metal. Typical transition metals may be Mn or Fe (for cost and environmental reasons), although Co, Ni, Cr, V, Ti, Cu, Zr, Nb, W, Mo (among others), or combinations thereof, may be used to wholly or partially replace Mn, Fe, or a combination thereof. In embodiments of the present invention, Mn is a preferred transition metal. In some embodiments, cathode electrodes may comprise multiple active cathode materials, either in a homogenous or near homogenous mixture or layered within the cathode electrode.

In some embodiments, the initial active cathode material comprises $NaMnO_2$ (birnassite structure) optionally doped with one or more metals, such as Li or Al.

In some embodiments, the initial active cathode material comprises $\lambda$-$MnO_2$ (i.e., the cubic isomorph of manganese oxide) based material, optionally doped with one or more metals, such as Li or Al.

In these embodiments, cubic spinel $\lambda$-$MnO_2$ may be formed by first forming a lithium containing manganese oxide, such as lithium manganate (e.g., cubic spinel $LiMn_2O_4$) or non-stoichiometric variants thereof. In embodiments which utilize a cubic spinel $\lambda$-$MnO_2$ active cathode material, most or all of the Li may be extracted electrochemically or chemically from the cubic spinel $LiMn_2O_4$ to form cubic spinel $\lambda$-$MnO_2$ type material (i.e., material which has a 1:2 Mn to O ratio, and/or in which the Mn may be substituted by another metal, and/or which also contains an alkali metal, and/or in which the Mn to O ratio is not exactly 1:2). This extraction may take place as part of the initial device charging cycle. In such instances, Li-ions are deintercalated from the as-formed cubic spinel $LiMn_2O_4$ during the first charging cycle. Upon discharge, Na-ions from the electrolyte intercalate into the cubic spinel $\lambda$-$MnO_2$. As such, the formula for the active cathode material during operation is $Na_yLi_xMn_2O_4$ (optionally doped with one or more additional metal as described above, preferably Al), with $0 < x < 1$, $0 < y \leq 1$, and $x + y \leq 1.1$. Preferably, the quantity $x+y$ changes through the charge/discharge cycle from about 0 (fully charged) to about 1 (fully discharged). However, values above 1 during full discharge may be used. Furthermore, any other suitable formation method may be used. Non-stoichiometric $Li_xMn_2O_4$ materials with more than 1 Li for every 2Mn and 4O atoms may be used as initial materials from which cubic spinel $\lambda$-$MnO_2$ may be formed (where $1 \leq x < 1.1$ for example). Thus, the cubic spinel $\lambda$-manganate may have a formula $Al_zLi_xMn_{2-z}O_4$ where $1 \leq x < 1.1$ and $0 \leq z < 0.1$ before use, and $Al_zLi_xNa_yMn_2O_4$ where $0 \leq x < 1.1$, $0 \leq x < 1$, $0 \leq x+y < 1.1$, and $0 \leq z < 0.1$ in use (and where Al may be substituted by another dopant).

In some embodiments, the initial cathode material comprises $Na_2Mn_3O_7$, optionally doped with one or more metals, such as Li or Al.

In some embodiments, the initial cathode material comprises $Na_2FePO_4F$, optionally doped with one or more metals, such as Li or Al.

In some embodiments, the cathode material comprises $Na_{0.44}MnO_2$, optionally doped with one or more metals, such as Li or Al. This active cathode material may be made by thoroughly mixing $Na_2CO_3$ and $Mn_2O_3$ to proper molar ratios and firing, for example at about 800° C. The degree of Na content incorporated into this material during firing determines the oxidation state of the Mn and how it bonds with $O_2$ locally. This material has been demonstrated to cycle between $0.33 < x < 0.66$ for $Na_xMnO_2$ in a non-aqueous electrolyte.

Optionally, the cathode electrode may be in the form of a composite cathode comprising one or more active cathode materials, a high surface area conductive diluent (such as conducting grade graphite, carbon blacks, such as acetylene black, non-reactive metals, and/or conductive polymers), a binder, a plasticizer, and/or a filler. Exemplary binders may comprise polytetrafluoroethylene (PTFE), a polyvinylchloride (PVC)-based composite (including a PVC-$SiO_2$ composite), cellulose-based materials, polyvinylidene fluoride (PVDF), hydrated birnassite (when the active cathode material comprises another material), other non-reactive non-corroding polymer materials, or a combination thereof. A composite cathode may be formed by mixing a portion of one or more preferred active cathode materials with a conductive diluent, and/or a polymeric binder, and pressing the mixture into a pellet. In some embodiments, a composite cathode electrode may be formed from a mixture of about 50 to 90 wt % active cathode material, with the remainder of the mixture comprising a combination of one or more of diluent, binder, plasticizer, and/or filler. For example, in some embodiments, a composite cathode electrode may be formed from about 80 wt % active cathode material, about 10 to 15 wt % diluent, such as carbon black, and about 5 to 10 wt % binder, such as PTFE.

One or more additional functional materials may optionally be added to a composite cathode to increase capacity and replace the polymeric binder. These optional materials include but are not limited to Zn, Pb, hydrated $NaMnO_2$ (birnassite), and hydrated $Na_{0.44}MnO_2$ (orthorhombic tunnel structure). In instances where hydrated $NaMnO_2$ (birnassite) and/or hydrated $Na_{0.44}MnO_2$ (orthorhombic tunnel structure) is added to a composite cathode, the resulting device has a dual functional material composite cathode. A cathode electrode will generally have a thickness in the range of about 40 to 800 μm.

Current Collectors

In embodiments of the present invention, the cathode and anode materials may be mounted on current collectors. For optimal performance, current collectors are desirable that are electronically conductive and corrosion resistant in the electrolyte (aqueous Na-cation containing solutions, described below) at operational potentials.

For example, an anode current collector should be stable in a range of approximately −1.2 to −0.5 V vs. a standard $Hg/Hg_2SO_4$ reference electrode, since this is the nominal potential range that the anode half of the electrochemical cell is exposed during use. A cathode current collector should be stable in a range of approximately 0.1 to 0.7 V vs. a standard $Hg/Hg_2SO_4$ reference electrode.

Suitable uncoated current collector materials for the anode side include stainless steel, Ni, NiCr alloys, Al, Ti, Cu, Pb and Pb alloys, refractory metals, and noble metals.

Suitable uncoated current collector materials for the cathode side include stainless steel, Ni, NiCr alloys, Ti, Pb-oxides ($PbO_x$), and noble metals.

Current collectors may comprise solid foils or mesh materials.

Another approach is to coat a metal foil current collector of a suitable metal, such as Al, with a thin passivation layer that will not corrode and will protect the foil onto which it is deposited. Such corrosion resistant layers may be, but are not limited to, TiN, CrN, C, CN, NiZr, NiCr, Mo, Ti, Ta, Pt, Pd, Zr, W, FeN, CoN, etc. These coated current collectors may be used for the anode and/or cathode sides of a cell. In one embodiment, the cathode current collector comprises Al foil coated with TiN, FeN, C, or CN. The coating may be accomplished by any method known in the art, such as but not limited to physical vapor deposition such as sputtering, chemical vapor deposition, electrodeposition, spray deposition, or lamination.

Electrolyte

Embodiments of the present invention provide a secondary (rechargeable) energy storage system which uses a water-based (aqueous) electrolyte, such as a Na-based aqueous electrolyte. This allows for use of much thicker electrodes, much less expensive separator and current collector materials, and benign and more environmentally friendly materials for electrodes and electrolyte salts. Additionally, energy storage systems of embodiments of the present invention can be assembled in an open-air environment, resulting in a significantly lower cost of production.

Electrolytes useful in embodiments of the present invention comprise a salt dissolved fully in water. For example, the electrolyte may comprise a 0.1 M to 10 M solution of at least one anion selected from the group consisting of $SO_4^{2-}$, $NO_3^-$, $ClO_4^-$, $PO_4^{3-}$, $CO_3^{2-}$, $Cl^-$, and/or $OH^-$. Thus, Na cation containing salts may include (but are not limited to) $Na_2SO_4$, $NaNO_3$, $NaClO_4$, $Na_3PO_4$, $Na_2CO_3$, $NaCl$, and $NaOH$, or a combination thereof.

In some embodiments, the electrolyte solution may be substantially free of Na. In these instances, cations in salts of the above listed anions may be an alkali other than Na (such as Li or K) or alkaline earth (such as Ca, or Mg) cation. Thus, alkali other than Na cation containing salts may include (but are not limited to) $Li_2SO_4$, $LiNO_3$, $LiClO_4$, $Li_3PO_4$, $Li_2CO_3$, $LiCl$, and $LiOH$, $K_2SO_4$, $KNO_3$, $KClO_4$, $K_3PO_4$, $K_2CO_3$, $KCl$, and $KOH$. Exemplary alkaline earth cation containing salts may include $CaSO_4$, $Ca(NO_3)_2$, $Ca(ClO_4)_2$, $CaCO_3$, and $Ca(OH)_2$, $MgSO_4$, $Mg(NO_3)_2$, $Mg(ClO_4)_2$, $MgCO_3$, and $Mg(OH)_2$. Electrolyte solutions substantially free of Na may be made from any combination of such salts. In other embodiments, the electrolyte solution may comprise a solution of a Na cation containing salt and one or more non-Na cation containing salt.

Molar concentrations preferably range from about 0.05 M to 3 M, such as about 0.1 to 1 M, at 100° C. for $Na_2SO_4$ in water depending on the desired performance characteristics of the energy storage device, and the degradation/performance limiting mechanisms associated with higher salt concentrations. Similar ranges are preferred for other salts.

A blend of different salts (such as a blend of a sodium containing salt with one or more of an alkali, alkaline earth, lanthanide, aluminum and zinc salt) may result in an optimized system. Such a blend may provide an electrolyte with sodium cations and one or more cations selected from the group consisting of alkali (such as Li or K), alkaline earth (such as Mg and Ca), lanthanide, aluminum, and zinc cations.

Optionally, the pH of the electrolyte may be altered by adding some additional OH—ionic species to make the electrolyte solution more basic, for example by adding NaOH other $OH^-$ containing salts, or by adding some other $OH^-$ concentration-affecting compound (such as $H_2SO_4$ to make the electrolyte solution more acidic). The pH of the electrolyte affects the range of voltage stability window (relative to a reference electrode) of the cell and also can have an effect on the stability and degradation of the active cathode material and may inhibit proton ($H^+$) intercalation, which may play a role in active cathode material capacity loss and cell degradation. In some cases, the pH can be increased to 11 to 13, thereby allowing different active cathode materials to be stable (than were stable at neutral pH 7). In some embodiments, the pH may be within the range of about 3 to 13, such as between about 3 and 6 or between about 8 and 13.

Optionally, the electrolyte solution contains an additive for mitigating degradation of the active cathode material, such as birnassite material. An exemplary additive may be, but is not limited to, $Na_2HPO_4$, in quantities sufficient to establish a concentration ranging from 0.1 mM to 100 mM.

Separator

A separator for use in embodiments of the present invention may comprise a cotton sheet, PVC (polyvinyl chloride), PE (polyethylene), glass fiber or any other suitable material.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. An electrochemical energy storage system comprising:
   first electrochemical cells that are electrically connected and disposed in a first stack; and
   second electrochemical cells that are electrically connected and disposed in a second stack, wherein,
   the first electrochemical cells comprise anode electrodes and cathode electrodes that are thicker than the respective anode electrodes and cathode electrodes of the second electrochemical cells,
   the first stack and the second stack are electrically connected in parallel, and
   the first and the second electrochemical cells belong to the same class of electrochemical cells.

2. The electrochemical energy storage system of claim 1, wherein the second electrochemical cells are configured to be charged and discharged with at least one of higher power densities and specific power values than the first electrochemical cells.

3. The electrochemical energy storage system of claim 1, wherein the first electrochemical cells and the second electrochemical cells each comprise:
   an electrolyte; and
   a separator located between the anode electrode and the cathode electrode,
   wherein the anode electrode, cathode electrode, electrolyte and separator of the second electrochemical cells are made of the same materials as the respective anode electrode, cathode electrode, electrolyte and separator of the first electrochemical cells.

4. The electrochemical energy storage system of claim 3, wherein:
   the cathode electrode in operation reversibly intercalates alkali metal cations; and
   the anode electrode comprises a capacitive electrode which stores charge through a reversible nonfaradiac reaction of alkali metal cations on a surface of the anode electrode or a pseudocapacitive electrode which undergoes a partial charge transfer surface interaction with alkali metal cations on a surface of the anode electrode.

5. The electrochemical energy storage system of claim 4, wherein the anode electrode comprises activated carbon and the cathode electrode comprises a doped or undoped cubic spinel $\lambda$-$MnO_2$-type material.

6. The electrochemical energy storage system of claim 1, wherein the first stack and the second stack have the same number of electrochemical cells.

7. The electrochemical energy storage system of claim 1, further comprising third electrochemical cells the third electrochemical cells each having:
- an anode electrode;
- a cathode electrode;
- an electrolyte; and
- a separator located between the anode electrode and the cathode electrode,
- wherein the anode electrode, cathode electrode, electrolyte and separator of the electrochemical cells comprise the same materials as the respective anode electrode, cathode electrode, electrolyte and separator of the first and second electrochemical cells, and both the anode and the cathode electrodes of the respective first and second electrochemical cells are thicker than the respective anode and cathode electrodes of the third electrochemical cells.

8. The electrochemical energy storage system of claim 7, wherein each of the second electrochemical cells comprises thicker anode and cathode electrodes than respective anode and cathode electrodes of the third electrochemical cells.

9. The electrochemical energy storage system of claim 1, wherein the first electrochemical cells and the second electrochemical cells are impedance matched for a predetermined duty profile.

10. The electrochemical energy storage system of claim 1, wherein the first electrochemical cells and the second electrochemical cells are made of the same materials and the geometries thereof are optimized for at least one of a higher energy density and a higher power density at the electrode level.

11. A method of making an electrochemical energy storage system, comprising:
- electrically coupling first electrochemical cells in a first stack, and electrically coupling second electrochemical cells in a second stack; and
- electrically connecting the first stack and the second stack in parallel, wherein,
- the first electrochemical cells comprise anode electrodes and cathode electrodes that are thicker than the respective anode electrodes and cathode electrodes of the second electrochemical cells, and
- the first and the second electrochemical cells belong to the same class of electrochemical cells.

12. The method of claim 11, further comprising:
- performing a Fourier analysis on a predetermined duty profile to determine time domains for energy storage; and
- impedance matching the first electrochemical cells and the second electrochemical cells for the predetermined duty profile.

13. The method of claim 11, wherein the first electrochemical cell and the second electrochemical cell each comprise:
- an electrolyte; and
- a separator located between the anode electrode and the cathode electrode,
- wherein the anode electrode, cathode electrode, electrolyte and separator of the second electrochemical cell comprise same materials as the respective anode electrode, cathode electrode, electrolyte and separator of the first electrochemical cell.

14. The method of claim 13, further comprising electrically connecting a third stack in parallel to the first and second stack, the third stack comprising third electrochemical cells, the third electrochemical cell having a different geometry than the first and second electrochemical cells.

15. A method of making an electrochemical energy storage system, comprising:
- operatively connecting at least a first type of electrochemical cell and a second type of electrochemical cell, wherein the first type of electrochemical cell and the second type of electrochemical cell have different geometries;
- wherein the first type of electrochemical cell and the second type of electrochemical cell each comprise:
  - an anode electrode;
  - a cathode electrode;
  - an electrolyte; and
  - a separator located between the anode electrode and the cathode electrode,
  - wherein the anode electrode, cathode electrode, electrolyte and separator of the second type of electrochemical cell comprise same materials as the respective anode electrode, cathode electrode, electrolyte and separator of the first type of electrochemical cell, and both the anode and the cathode electrodes of the first type of electrochemical cell are thicker than the respective anode and cathode electrodes of the second type of electrochemical cell,
- performing a Fourier analysis on a predetermined duty profile;
- determining time domains over which energy should be stored for the first type of electrochemical cell and the second type of electrochemical cell based on the step of performing; and
- selecting the anode and cathode thickness of the first and second types of cells based on the step of determining.

* * * * *